United States Patent Office 2,832,503
Patented Apr. 29, 1958

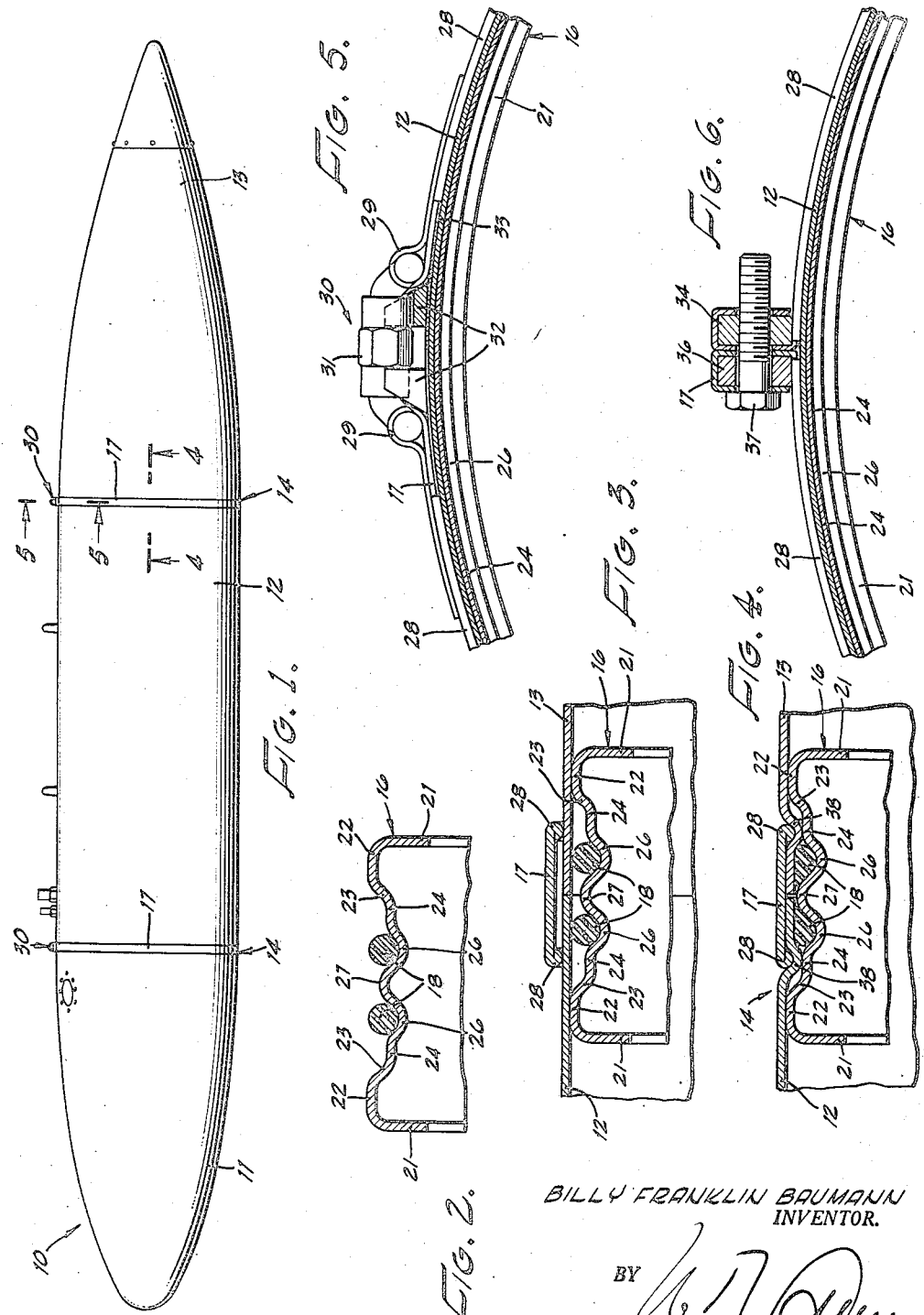

---

2,832,503

METHOD AND APPARATUS FOR SEALINGLY JOINING FUEL TANK SECTIONS, AND FUEL TANKS FORMED THEREBY

Billy Franklin Baumann, Northridge, Calif., assignor to Royal Jet, Inc., Alhambra, Calif., a corporation of California Application August 16, 1954, Serial No. 450,004

3 Claims. (Cl. 220—80)

This invention relates to a method and apparatus for joining the cylindrical ends of container sections, and to a jettisonable fuel tank formed by joining a plurality of sections in sealed endwise relation.

Jettisonable fuel tanks for aircraft are frequently manufactured in at least three sections which may be nested in a compact arrangement for shipping purposes. After shipment to air fields in all parts of the world, the disassembled and nested tank sections must be assembled into the completed tanks, after which they are mounted beneath the wings of aircraft in order to increase the fuel capacity thereof.

Since at least two jettisonable fuel tanks are mounted on an airplane for each combat mission, and since the tanks are jettisoned when emptied instead of being returned to the air field, it will be understood that an enormous number of such tanks are employed in any military operation utilizing substantial numbers of airplanes. Because of the fact that great numbers of fuel tanks must be assembled in the field, and because of the fact that the persons assembling the tanks are frequently Army personnel who in certain instances are not skilled in such mechanical operations, it is extremely important that the circumferential joints between the tank sections have only a small number of parts and be capable of rapid assembly. In spite of this requirement of speed of assembly, however, it has in the past been conventional to employ as many as one hundred or two hundred separate parts for the circumferential joints, this being because the joints are subjected to very large vibratory and tensile stresses when secured to the wings of aircraft flying at high speeds.

In view of the above factors characteristic of the field of circumferential joints between aircraft fuel tank sections, it is an object of the present invention to provide a method and apparatus for joining cylindrical tank section ends with but a few parts and by relatively unskilled personnel, yet which results in an extremely strong sealed joint capable of withstanding the vibratory and tensile stresses to which the tanks are subjected when mounted on the wings of high speed aircraft.

Another object of the invention is to provide a strong, sealed joint which is assembled without employing nuts, bolts or washers, there being only a single part to be tightened by the mechanic assembling the tank.

A further object of the invention is to provide a tank the sections of which may be deformed in the field to provide a strong circumferential joint which is sealed against leakage of aircraft fuel.

These and other objects and advantages of the invention will be more fully set forth in the following specification and claims considered in connection with the attached drawing to which they relate.

In the drawing:

Figure 1 is a side elevational view of an aircraft fuel tank having two joints assembled in accordance with the present invention;

Figure 2 is a transverse sectional view of the retaining or abutment ring, and illustrating the two sealing rings in position;

Figure 3 shows two cylindrical tank section ends disposed in endwise abutment between the retaining ring of Figure 2 and an encircling girth ring or strap;

Figure 4 is a section on line 4—4 of Figure 1, and illustrates the components of Figure 3 after tightening of the girth ring to deform the tank section end portions;

Figure 5 is a sectional view taken along line 5—5 of Figure 1 and showing the turnbuckle adapted to tighten the girth ring; and Figure 6 illustrates an alternate form of the invention in which a bolt and nut are substituted for the turnbuckle of Figure 5.

Broadly stated, the invention comprises the concept of joining tank sections of lightweight deformable metal, such as rolled aluminum, by disposing them in endwise relation and applying end tension to an encircling girth strap. Preferably, an abutment ring is provided interiorly of the tank and is so shaped that when the ends of the tank sections are deformed against it an extremely strong interlocking relationship will result. Sealing rings, such as rubber O-rings, are placed in positions such that the girth-tightening or deforming operation will effect seals at the points necessary to prevent leakage of the aircraft fuel subsequently contained within the assembled tank.

Referring to the drawing, the invention is illustrated as embodied in a thin-walled jettisonable aircraft fuel tank 10 having a nose section 11, a center section 12, and a tail section 13. The center section 12 is perfectly cylindrical, whereas nose section 11 and tail section 13 are streamlined in shape although generally cylindrical at their end portions where they are joined to center section 12 by means of joints indicated generally by the reference numeral 14. It is to be understood that when the tank is shipped from the factory to the air field where it is to be employed, the nose and tail sections 11 and 13 are nested together within center section 12, so that a compact unit results. The joints 14 being identical in construction, only the one between center section 12 and tail section 13 will be described.

Referring particularly to Figures 2-4, the components of each joint 14 are seen to comprise a retaining or abutment ring 16, a girth ring or strap 17, and a pair of sealing rings 18. Retaining ring 16 is preferably a rolled section of high strength aluminum alloy, whereas girth ring 17 is a flexible thin steel band or strip having a high tensile strength. Sealing rings 18 are preferably large diameter O-rings formed of rubber or the like, and the skin of each tank section 11—13 is rolled aluminum or similar metal capable of ready deformation. It has been discovered that the deformability, represented by ductility, malleability, etc., of the skin sections is such that when their cylindrical end portions are necked down upon tightening of the encircling girth ring 17 no crimping or crinkling will occur, the necking being instead highly uniform and operating to provide a sealed joint having a very high tensile strength.

Retaining or abutment ring 16 is preferably shaped with a pair of inwardly extending edge flanges 21 which impart strength to the ring, the flanges merging in each instance with cylindrical shoulder sections 22 adapted to abut the interior surfaces of skin sections 12 and 13. The cylindrical shoulder sections 22 merge at their edges opposite flanges 21 with frusto-conical walls 23 which in turn lead to cylindrical portions 24 corresponding to shoulder sections 22 but of lesser diameter, it being understood that the shoulder sections 22, the conical walls 23 and the cylindrical portions 24 are co-axial with tank sections 12 and 13. At their edges remote from frusto-conical walls 23, cylindrical portions 24 merge with portions 26 which curve inwardly to provide seats for the O-rings 18. The portions 26 are generally adjacent each other and are separated by a raised ridge 27, the crest of ridge 27 being preferably at the same radial position as the cylindrical portions 24.

It is to be understood that the described integral and symmetrical construction of ring 16 results in a peripheral channel adapted to receive the tank section end portions, the channel being defined by elements or portions 23, 24, 26 and 27. Furthermore, the walls or portions 22 and 23 form together shoulder elements such that the necked down tank section ends may not be drawn therepast.

Girth ring or strap 17 is a thin flat band having internal beads 28 on its edges, the width of the band being such that beads 28 are disposed radially outwardly of the cylindrical portions 24 of abutment ring 16. As illustrated in Figure 5, the ends of girth ring 17 are bent over and welded to form loops 29 which pass over the ends of a suitable turnbuckle 30. The nut portion 31 of turnbuckle 30 seats rotatably in a fitting 32, the lower portion of the latter being welded to a thin plate 33 adapted to be inserted beneath the ends of girth ring 17 in order to hold the turnbuckle in position during the tightening operation. The operation of the turnbuckle 30 is such that the looped strap ends 29 will be drawn toward each other to effect tensioning of the strap upon rotation of nut 31 in a given direction and by a wrench or the like. Referring to Figure 6, the turnbuckle 30 may be replaced by a nut and bolt connection if desired, one end of the strap 17 being looped around the nut 34 and the other strap end being looped around a washer 36. A bolt 37 is inserted through holes in one strap end and its washer 36, and is threaded into and through the nut 34 and holes in the other strap end, so that turning of the bolt operates to draw the strap ends together as desired.

In practicing the method of the invention, the skin sections 12 and 13 are disposed in coaxial endwise relation and girth ring 17 is placed therearound, both the girth ring and the skin end portions being radially adjacent peripherally channelled retaining or abutment ring 16. It is then merely necessary to reduce the diameter of girth ring 17 by drawing its ends together so that the resultant pressure operates to neck down the end portions of skin sections 12 and 13 into the peripheral channel in abutment ring 16, seals 18 being provided where necessary to prevent leakage of fluid from the completed tank.

More specifically and with the apparatus illustrated in Figures 2–5 of the drawing, the invention is practiced by seating the O-rings 18 in groove portions 26 of abutment ring 16, and then placing the skin sections 12 and 13 in endwise abutment so that the line of abutment is radially adjacent the raised ridge 27. The O-rings 18 are of such a cross-sectional diameter that they engage both the portions 26 and the skin sections, the skin sections being also engaged by the cylindrical shoulder sections 22. Girth ring 17 is then mounted in position by slipping the same over tail section 13, the fitting 32 being inserted beneath nut 31 to provide a journal therefor as previously indicated. The location of girth ring 17 is such that its beads 28 are generally radially outwardly of cylindrical portions 24 of abutment ring 16.

After the parts are thus assembled initially and as shown in Figure 3, the nut 31 is turned in a direction effecting drawing of looped end portions 29 of girth ring 17 toward each other, which decreases the diameter of the girth ring. As turning of the nut 31 progresses, the cylindrical end portions of skin sections 12 and 13 are reduced in diameter or necked own, without crimping or buckling, to effect deformation of O-rings 18 as indicated in Figure 4, and also to form channels 38 in the skin sections due to the pressure engagement of beads 28 thereover. Turning of the nut 31 is continued until the channels 38 are deformed into engagement with cylindrical portions 24 of abutment ring 16, the girth ring 17 then being approximately flush with the skin sections 12 and 13 so that the resulting joint 14 is externally clean and smooth and provides substantially no resistance to air flow.

After the joint has been completed as shown in Figure 4, the O-rings 18 are sufficiently deformed to prevent any leakage of fluid through the joints. Furthermore, the joint has very high tensile strength since any attempt to draw the skin section 12 away from skin section 13 will be resisted by the action of beads 28 which seat in channels 38. Additionally, should the skin sections 12 and 13 be drawn somewhat apart due to the presence of extremely high tensile stresses, the channels 38 will come into abutment with frusto-conical walls 23 which will operate to further increase the resistance of the joint to breaking.

In the described manner, an extremely strong and aerodynamically clean sealed joint has been provided with a minimum number of parts and by merely turning the nut 31 of turnbuckle 30. This is to be compared with conventional fuel tank joints which comprise hundreds of nuts, bolts, sealing rings, washers, etc., yet which are aerodynamically less satisfactory, and in many instances have lower tensile strengths, than the present joint.

While the particular method and apparatus herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. A joint for a jettisonable aircraft fuel tank formed of thin-walled rolled aluminum, said tank comprising a plurality of sections having cylindrical end portions which are butted against each other, which comprises an annular abutment element mounted in said tank radially inwardly of said butted end portions, said abutment element having a relatively wide shallow peripheral channel the bottom wall of which is formed with a groove adjacent each side of the line of contact of said butted end portions, an O-ring mounted in each of said grooves, and a flexible steel girth strip mounted radially outwardly of said channel bottom wall and encompassing said line of contact of said butted end portions, said girth strip being provided with means permitting manual reduction in the diameter thereof and being reduced in diameter by an amount sufficient to neck down said butted end portions into said peripheral channel, said necking down resulting in deformation of said O-rings into sealing engagement with said abutment element and end portions and also resulting in interlocking of said end portions with the shoulder portions of said abutment element on each side of said channel.

2. The invention as claimed in claim 1, in which said girth strip is provided on each of its edges with an internal bead or ridge.

3. A pair of nesting rings adapted to join together in a fluid tight manner the abutting rim edges of sheet metal tubular sections of a jettisonable fuel tank or the like aerodynamically contoured structure, said rings including a high-strength relatively wide inner ring having a depressed central area and lateral rim edges adapted to fit snugly beneath the adjacent edges of tubular sections with said tube section rims in close proximity opposite said depressed central area of said ring, a relatively narrow outer ring of adjustable circumferential length adapted to bridge the rim edges of said tubular sections, and means for placing said outer rim in tension to reduce the circumferential length thereof and neck down the rims of said tubular sections into the depressed area of said inner ring thereby locking said sections rigidly assembled, said outer ring being flat and its outer surface lying substantially flush with the adjacent surface areas of said tubular sections in the assembled position of said rings to provide a substantially unbroken aerodynamic exterior surface from end to end of the rigidly joined tubular sections, and the opposite lateral edges of said outer ring being reversely bent inwardly against the inner surface of said ring to provide beads projecting inwardly and effective upon the tensioning of the outer ring to form interlocking grooves in the underlying rim edge portions of said tubular sections.

References Cited in the file of this patent

UNITED STATES PATENTS

| | | | |
|---|---|---|---|
| 817,314 | Hahn | Apr. 10, | 1906 |
| 831,719 | Hahn | Sept. 25, | 1906 |
| 1,303,532 | Avery | May 13, | 1919 |
| 1,678,640 | Hall | July 31, | 1928 |
| 2,026,501 | Jensen | Dec. 31, | 1935 |
| 2,124,441 | Twaits | July 19, | 1938 |
| 2,545,481 | Maier | Mar. 20, | 1951 |
| 2,653,541 | Kanode et al. | Sept. 29, | 1953 |
| 2,685,964 | Brown | Aug. 10, | 1954 |
| 2,751,109 | Moore | June 19, | 1956 |